Patented Dec. 24, 1940

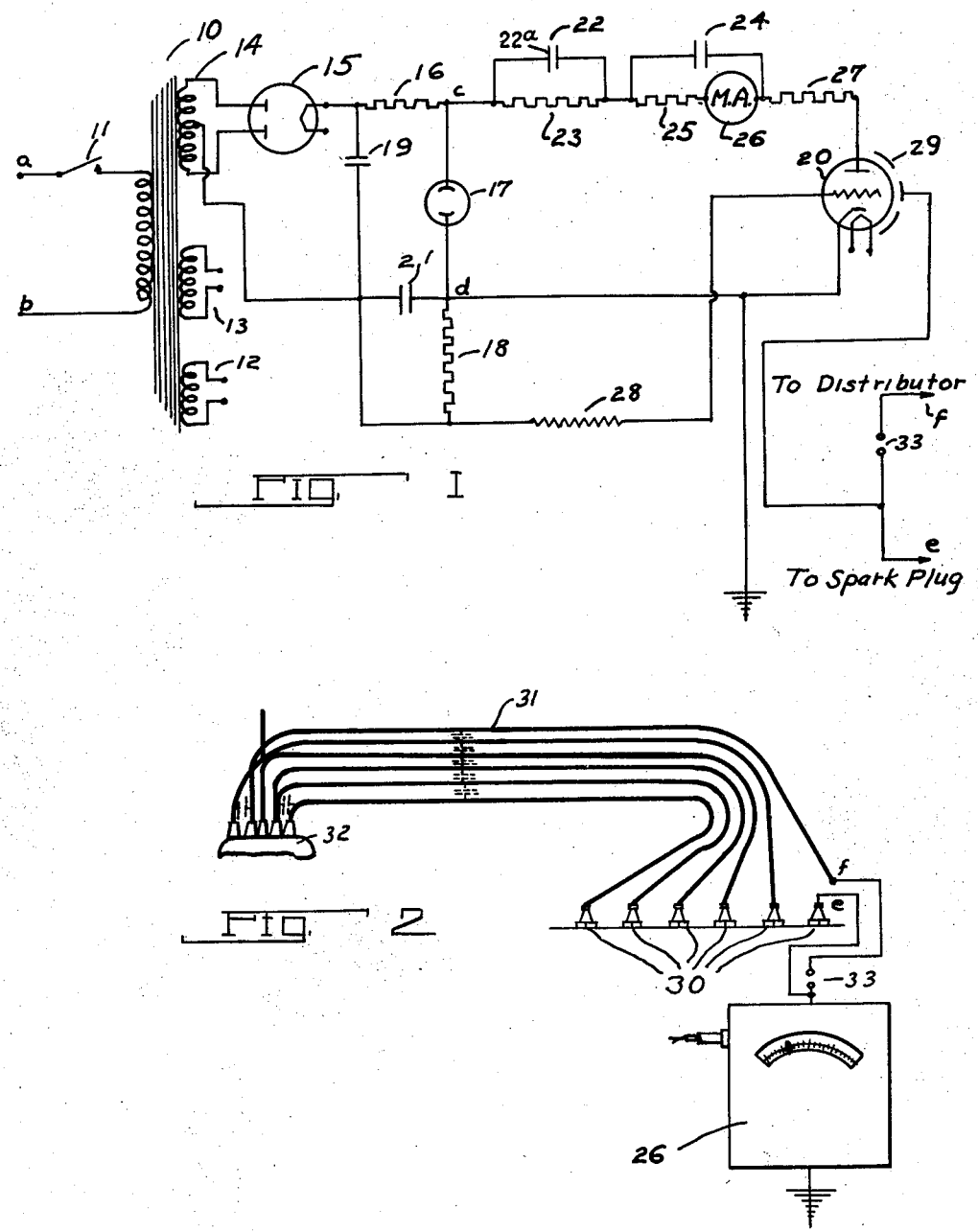
Dec. 24, 1940. R. E. STURM ET AL 2,226,185
RATE MEASURING APPARATUS
Filed Jan. 6, 1938
INVENTORS.
RALPH E. STURM
GEORGE V. ELTGROTH
BY McConkey Dawson & Booth
ATTORNEYS.

2,226,185

UNITED STATES PATENT OFFICE 2,226,185

RATE MEASURING APPARATUS

Ralph E. Sturm and George V. Eltgroth, Chicago, Ill., assignors to Bendix Radio Corporation, Chicago, Ill., a corporation of Delaware Application January 6, 1938, Serial No. 183,668

6 Claims. (Cl. 175—183)

This invention relates to rate measuring apparatus and more particularly to electrical apparatus adapted for measuring the speed of a spark ignition engine. The device may be used, however, for measuring frequencies of electrical impulses in other situations and for different purposes.

An object of the invention is to provide rate measuring apparatus which is dependable, convenient and accurate, and which will directly indicate the value of the rate being measured.

Another object is to provide rate measuring apparatus which is substantially insensitive to fluctuations in the power supply, and which minimizes so far as possible the error due to voltage variation of the power source.

Another object of the invention is to provide apparatus which is unaffected by impulses other than the ones being measured, so that the device may be used in connection with the ignition system of an internal combustion engine or in other situations where foreign impulses tend to present an interfering influence.

The apparatus of this invention is of the type in which a condenser is charged and discharged at a rate determined by the frequency to be measured, the amount of the charges received on the condenser being a measure of the frequency or the rate at which the successive charges and discharges is taking place. Prior devices of this nature have been subject to errors for various reasons. It is obvious that if the amount of charges received on the condenser is to be a measure of the frequency of the charges, the condenser must not be charged to different potentials at different periods recurring at any given frequency. It is clear also that if the potential applied to the condenser charging circuit varies even between narrow limits, this will have a substantial effect upon the accuracy of the measurement obtained, for the greater the potential applied to the circuit, other conditions remaining equal, the greater will be the charge which it obtains.

To maintain a constant potential in the condenser charging circuit, I found that the peculiar characteristics of the neon tube or other gas filled tubes may be used to obtain good results. This type of tube has the ability to pass varying amounts of current with but very little variation in the voltage drop across it, and this principle is made use of in my improved apparatus as will appear more clearly later in this specification.

Another source of error has been the tendency of the condenser to build up momentarily to a voltage in excess of the source voltage in the charging circuit. Such overcharging of the condenser above the steady state condition disturbs the accuracy of the meter for indicating the rate of the impulses received and has presented a problem which had not been solved satisfactorily prior to my invention. To overcome this source of error I provide in series with the voltage supply and condenser a control device which is sensitive to voltage changes, so that when the condenser is charged to some predetermined amount the voltage across this control device will be so low that the device will no longer conduct and further charge of the condenser will be prevented.

Another source of trouble in devices of this nature especially where the device is used to measure the speed of a spark ignition engine, was that the operation of the apparatus seemed not to be the same when used in connection with different engines; that is, if the apparatus were adjusted for use with a four cylinder engine, it would not operate successfully when used in connection with a six cylinder engine. Also, the reading of such devices has been known to vary with atmospheric conditions and with different gasoline mixtures and with different degrees of compression in the cylinders of the engines.

I have discovered that inaccuracies due to variations in conditions as above mentioned are mainly due to electrical impulses on other wires or surfaces which lie adjacent the conductor over which the impulses being measured are passed. In most motor cars the wires leading from the distributor to the spark plugs are held together in the form of a cable and in all cases they are adjacent to one another, presenting a condition in which there is capacity between the wires and between each of the wires and the frame or ground; and though as ordinarily considered these wires are isolated from each other, there is sufficient capacity between them to allow the transference of impulses one to the other, these transferred impulses being of sufficient strength to operate a vacuum tube to affect the charge on the condenser and thereby destroy the accuracy of the reading. To prevent this difficulty I provide a spark gap which effectively isolates other wires and surfaces so that the capacity between the wires can have no effect on the charging or discharging of the condenser.

Various other objects and advantages of the invention will be apparent as the specification proceeds.

A preferred embodiment of the invention is illustrated in the accompanying drawing in which:

Figure 1 is a schematic diagram of the electrical circuit, and Figure 2 is an illustrative view showing the application of the device in connection with the ignition circuit of a spark ignition engine.

As illustrated in Figure 1, electrical energy may be supplied to the apparatus through a transformer 10, the primary winding of this transformer being connected through switch 11 to any alternating current source ab such as an ordinary 110 volt outlet. The secondary side of transformer 10 may comprise windings 12 and 13 which may supply the power for lighting the filaments of the discharge tubes. The secondary winding 14 has its terminals connected to the anodes of the rectifier tube 15. The cathode of tube 15 is connected through resistor 16, gaseous tube 17, and resistor 18, to the mid point on winding 14. It is obvious that the alternating current energy obtained from the service outlet is thus translated into pulsating direct current at the output of the rectifier tube. Across the output of the rectifier tube is connected a storage condenser 19 which operates to absorb the peaks of the pulsating direct current and provides a substantially steady flow of direct current through resistors 16 and 18 and tube 17. The resistor 18 is for the purpose of supplying grid potential to the tube 20 later to be described, and across this resistor is connected the condenser 21 which further absorbs the current ripple through this resistor and furnishes low impedance path. The resistor 16, as well as the resistor 18, provides in the direct current circuit a voltage drop which varies with the current passed through it.

The tube 17 has a voltage drop across its terminals which varies very little in comparison with changes in the amount of current which passes through it. From this it is apparent that an increase in the source potential will cause an increase in the voltage drops across resistors 16 and 18, but will affect the voltage across the terminals of the tube 17 very little. Any device which has the ability to pass increased amounts of current at very little change in terminal voltage may be substituted for the gas filled tube here described.

The condenser charging circuit is connected across the tube 17 and the terminals cd of this tube may be considered the voltage supply for the charging circuit. Following the circuit from terminal c, it is seen that the condenser 22 is connected in series with the voltage supply and is shunted by the resistor 23 connected across its terminals. The condenser 22 is preferably of relatively low capacity and the resistor is of substantial value, its necessary size being calculable in a way later to be explained. Also in series connection is the condenser 24 which is preferably of relatively large capacity, and shunted across this condenser is a resistor 25 and a current-sensitive meter 26 which may be a milliameter. Beyond condenser 24 in the condenser charging circuit is the limiting resistor 27 and the gaseous discharge tube 20, the anode-cathode circuit of this tube being connected in the condenser charging circuit. The grid of tube 20 is connected through protective resistor 28 to the negative side of the resistor 18. The grid of tube 20 is thus maintained at a potential which is sufficiently negative to prevent conduction in the anode-cathode circuit in the absence of any other ionizing impulse.

As here shown tube 20 is provided with an exterior electrode 29 which is capable of ionizing the gas within tube 20 upon receiving an electrical impulse. This electrode is intended to be connected to the ignition circuit of an automobile engine for example at a point between a spark plug 30 and the cable 31 leading to the distributor 32 (see Figure 2). Between the point of connection and the cable 31 is a small spark gap 33 which may be, for example, about .025 inch.

Preferably the tube 20 should be of the gaseous discharge type in which once the gas contained therein is ionized, the tube will remain conducting until the anode-cathode voltage drops to a definite value, the grid having no control of tube's operation once the gas has become ionized. However, another type of tube or device might be used by proper adjustment so that it will conduct upon receiving an impulse from the frequency source being measured. It is preferable that the control device being used, such as tube 20, be adapted to cut off current flow through it when the voltage across it drops to some definite value. By the use of proper constants it is possible to use a diode gaseous discharge tube with some means for ionizing the gas contained in it when an electrical impulse is received. Though the source of frequencies to be measured is here shown connected to the exterior electrode 29, it is possible to connect the frequency source direct through suitable impedance to the internal grid. The connection as here shown is preferred, however, because it makes for more stable operation of the tube.

All of the above described apparatus may be enclosed in a small case and may be conveniently carried about from place to place for testing the speeds of various motors or other devices, or if desired the equipment may be mounted in an automobile or other unit for giving a continual indication of the speed of the unit to which it is attached.

In using the improved measuring device, the operator has only to connect the source terminals a and b by plugging into any convenient service outlet, close switch 11, and connect points e and f respectively to the spark plug and the spark plug connecting wire. If properly calibrated the meter 26 will read directly the speed of the motor being tested.

The theory of the operation is believed to be as follows: Alternating current from the service outlet flowing through the primary of transformer 10 causes an alternating current in secondary winding 14. Due to the action of rectifier 15 the current flowing from the ends of this winding through tube 15, resistor 16, tube 17, resistor 18 and back to the center point of this winding, is pulsating direct current. The condenser 19 connected across the output of tube 15 receives and emits charges and so acts as a storage container tending to smooth off the peaks of current flow. In addition to providing a low impedance path the condenser 21 across resistance 18 further smooths out the current ripples for the particular benefit of the grid of control tube 20.

As was previously stated, the device 17 has the ability to permit increases and decreases in the current flowing through it with but very slight changes in the terminal voltage across it. Therefore, when the source voltage increases through one cause or another, the total voltage drop across resistors 16 and 18 and tube 17 will be increased and the direct current through this circuit will be increased. The voltage drop across tube 17 will remain the same, however, the increased drop being taken up by resistors 16 and 18. Thus the voltage supply across tube 17 remains substantially constant and independent of variations in the voltage of the power source.

Before the spark plug to which electrode 29 is connected fires, there will be no current flow in the condenser charging circuit, and condensers 22 and 24 will remain uncharged. As soon as the distributor of the ignition system has moved to a position for firing the connected spark plug, the gap 33 is easily broken down and an impulse is delivered to the electrode 29 which causes the tube 20 to be ionized and in condition to conduct current.

At this instant, condenser charging current starts to flow from point c to plate 22a of condenser 22. Since the condenser 24 is also in this same charging circuit, this condenser also will receive a like amount of charge as is received on condenser 22. During the transient in which the condensers are receiving their charge the shunt resistors 23 and 25 have little or no effect and their presence during this instant may be neglected.

As the charge on condenser 22 builds up, its terminal voltage is increased, and this operates to decrease the voltage which is across the anode-cathode of control tube 20. After the voltage across condenser 22 builds up to the point when the voltage across tube 20 is insufficient to maintain ionization, this tube ceases to conduct at all, and the charging circuit is broken. It is now apparent that as the voltage supply is maintained at a value which is as near constant as possible, tube 20 will always cut off the circuit when the charge on condenser 22 has attained some specific value. The charge which is obtained on condenser 22, and also the charge obtained on condenser 24, is then, not limited by the capacity of condenser 22 alone, but is also under the control of tube 20. By proper adjustment of the constants of the circuit the charge received by each of these condensers at each impulse may be adjusted to any desired value and is limited only by the ability of the tube to cut off at low voltages or the capacity of the condenser for holding high charges.

After the charging circuit has been cut off as above described, the condenser 22 has until the next impulse or the next period of charge to discharge through the resistor 23. The value of resistor 23 and condenser 22 should bear such relation that the time constant of this discharging circuit permits the condenser to release at least a substantial amount of its charge before the next succeeding period of charge in the case of the most rapid rate to be measured. Condenser 24 preferably is of much larger capacity, say 100 times larger, than condenser 22, and serves to cause a fairly steady direct current to be discharged through the meter 26. Obviously the faster the recurring charges of equal amounts are delivered to the condenser 24, the greater will be the reading of the meter. The reading of the meter is thus a direct indication of the speeds or frequencies being measured.

The combination of the condenser 24, resistor 25 and meter 26 constitute, in the embodiment shown, means for measuring the flow of current effective for charging the condenser 22. It is within the limits of this invention to substitute other means for accomplishing this purpose; as for example, a single meter properly damped might be usable for making this measurement. Or, instead of measuring the flow through the condenser charging path, the measuring means might be placed in the discharge circuit of condenser 22. In the specification and claims the term "condenser current" will be used to indicate either the condenser charging current or the condenser discharging current.

If it were not for the spark gap 33 between the point of connection to the spark plug and the cable 31, the electrode 29 of tube 20 would be coupled to connecting wires leading to other spark plugs by reason of the capacity between the wires of the ignition system, and because of this, impulses probably of very high frequency, would be impressed on the tube when other spark plugs fire, which impulses would be sufficient to cause the tube to conduct. The presence of the spark gap causes the wire of the ignition system to which the tube is connected to be isolated from the whole ignition system when this one connected wire is not carrying an impulse. It will be apparent that charges which are received on any of the wires of the ignition system due to this capacitive effect between the wires and between the wires and ground will be far too weak to break across the gap 33 in the form of a spark, and the tube will thus be isolated from any foreign impulses while at the same time permitting the impulse to be delivered when the connected spark plug is designated by the distributor of the ignition system.

The theory of the operation of the device as above set forth is believed to be correct, but in setting out the above theory no waiver of any part of the invention is intended though the apparatus be found to operate on another theory.

While I have described one embodiment of the invention in detail, it is apparent that there may be many modifications of the invention and the apparatus as described may be changed in many details without departing from the spirit of the invention. The foregoing description has been given for clearness of understanding only, and no unnecessary limitations should be understood therefrom, but the appended claims should be construed as broadly as permissible in view of the prior art.

I claim:

1. Apparatus for measuring rates comprising a condenser, a voltage supply, a control device connected in series with said condenser and voltage supply, said device being normally nonconducting, means for rendering said device conducting at intervals corresponding with the rate to be measured whereby said condenser is charged at recurring periods, means for rendering said device nonconducting when said condenser has been charged to a predetermined voltage, a discharge path through which said condenser may discharge between said recurring periods, a second condenser connected in series with said condenser and said device, a second discharge path which discharge current from said second condenser may pass, and means for measuring the current flow in said second discharge path.

2. Apparatus for measuring rates comprising a condenser, a voltage supply, a control device connected in series with said condenser and voltage supply, said device being normally nonconducting, means for rendering said device conducting at intervals corresponding with the rate to be measured whereby said condenser is charged at recurring periods, means for limiting the charge received on said condenser at each of said periods to a predetermined amount, a discharge path shunted across said condenser and forming with said condenser a discharge circuit having a time constant such that said predetermined amount or a portion of the charge is dissipated through said circuit before the next succeeding period of charge in the case of the most rapid rate to be measured, and means for measuring the flow of condenser current.

3. Apparatus for measuring rates comprising a condenser, a voltage supply, a control device connected in series with said condenser and voltage supply, said device being normally nonconducting, means for rendering said device conducting at intervals corresponding with the rate to be measured whereby said condenser is charged at recurring periods, means for limiting the charge received on said condenser at each of said periods to a predetermined amount, a discharge path shunted across said condenser and forming with said condenser a discharge circuit having a time constant such that said predetermined amount of charge is dissipated through said circuit before the next succeeding period of charge in the case of the most rapid rate to be measured, a second condenser connected in series with said condenser and said device, said second condenser being of substantially larger capacity than said first-mentioned condenser, a second discharge path through which discharge current from said second condenser may pass, and means for measuring the current flow in said second discharge path.

4. Apparatus for measuring rates comprising a condenser, a voltage supply, a gaseous discharge tube having anode and cathode electrodes, said condenser and voltage supply being connected in series in the anode-cathode circuit of said tube, said tube being normally in nonconducting condition, means for delivering ionizing stimuli to said tube at intervals corresponding with the rate to be measured for rendering said tube conducting whereby said condenser is charged at recurring periods, a discharge path shunted across said condenser and forming with said condenser a condenser discharge circuit having a time constant such that the charges received on said condenser may be dissipated through it before the next succeeding period of charge in the case of the most rapid rate to be measured, and means for measuring the flow of condenser current.

5. In apparatus of the character set forth, a condenser, a condenser charging circuit including a source of energy and a normally nonconducting control device, means for delivering recurring electrical impulses to said device at the frequency to be measured whereby said device is rendered conducting and said condenser is charged at recurring periods, said means comprising a conductor having between the source of said impulses and the point of delivery to said device a spark gap whereby said apparatus is rendered insensitive to electrical charges adjacent said conductor between said spark gap and the source of said impulses, and means for measuring the flow of condenser current.

6. In apparatus adapted for use in checking the speed of a spark ignition engine, a condenser, a condenser charging circuit including a source of energy and a normally nonconducting gaseous discharge tube, means for delivering ionizing stimuli to said tube at the frequency to be measured whereby said tube is rendered conducting and said condenser is charged at recurring periods, said means comprising a conductor connected at its one end to the ignition circuit of said engine at a point between a spark plug and the source of energy of said ignition circuit, and a spark gap between said point of connection and the energy source of said ignition circuit.

RALPH E. STURM.
GEORGE V. ELTGROTH.